(12) United States Patent
Heinzmann et al.

(10) Patent No.: US 7,757,794 B2
(45) Date of Patent: Jul. 20, 2010

(54) VEHICLE CONTROL BY PITCH MODULATION

(75) Inventors: John D. Heinzmann, Manchester, NH (US); David W. Robinson, Manchester, NH (US); Jon M. Stevens, Manchester, NH (US); J. Douglas Field, Bedford, NH (US); Jeremy B. Lund, Amherst, NH (US)

(73) Assignee: Segway, Inc., Bedford, NH (US)

( * ) Notice: Subject to any disclaimer, the term of this patent is extended or adjusted under 35 U.S.C. 154(b) by 0 days.

(21) Appl. No.: 12/337,249

(22) Filed: Dec. 17, 2008

(65) Prior Publication Data

US 2009/0099762 A1 Apr. 16, 2009

Related U.S. Application Data

(60) Division of application No. 11/249,136, filed on Oct. 11, 2005, and a continuation-in-part of application No. 10/990,715, filed on Nov. 17, 2004, now abandoned, which is a continuation of application No. 10/460,053, filed on Jun. 12, 2003, now Pat. No. 6,827,163, which is a continuation-in-part of application No. 10/459,173, filed on Jun. 11, 2003, now Pat. No. 7,017,686.

(60) Provisional application No. 60/617,244, filed on Oct. 8, 2004, provisional application No. 60/388,723, filed on Jun. 14, 2002, provisional application No. 60/387,641, filed on Jun. 11, 2002.

(51) Int. Cl.
*B62D 11/02* (2006.01)
*B60K 11/00* (2006.01)

(52) U.S. Cl. .................. 180/6.5; 180/65.1; 180/282

(58) Field of Classification Search ................. 180/6.2, 180/6.48, 6.5, 7.1, 21, 65.1, 218, 271, 282, 180/290; 280/5.502–5.512; 701/124
See application file for complete search history.

(56) References Cited

U.S. PATENT DOCUMENTS 584,127 A 6/1897 Draullette et al.

(Continued)

FOREIGN PATENT DOCUMENTS

DE 2 048 593 5/1971

(Continued)

OTHER PUBLICATIONS

Kawaji, S., Stabilization of Unicycle Using Spinning Motion, *Denki Gakkai Ronbush, D*, vol. 107, Issue 1, Japan 1987, pp. 21-28.

(Continued)

*Primary Examiner*—Lesley Morris
*Assistant Examiner*—Marc A Scharich
(74) *Attorney, Agent, or Firm*—Pierce Atwood, LLP

(57) ABSTRACT

A method for fore-aft stabilization of a vehicle for motion in a specified direction over an underlying surface. The vehicle has at least one forward wheel and at least one aft wheel, and the forward wheel is characterized by a force normal to the instantaneous direction of motion of the vehicle. A motor actuator drives each aft wheel, and a controller governs the motor actuator or motor actuators in such a manner as to dynamically stabilize the vehicle, according to a uniform control law, when the forward wheel is in contact with the underlying surface or not. A torque is applied to the aft wheel on the basis of vehicle pitch or the force on the forward wheel normal to the direction of motion. Additionally, a periodic rotational modulation may be applied to the aft wheel, and a stabilizing torque provided based on a detected response, either of vehicle pitch or of normal force on the front wheel. Left and right motor actuators may independently control left and right aft wheels to continue turns as governed by user steering, whether or not forward wheels are in contact with the ground.

16 Claims, 11 Drawing Sheets

U.S. PATENT DOCUMENTS

| | | | |
|---|---|---|---|
| 849,270 A | 4/1907 | Schafer et al. | |
| 2,742,973 A | 4/1956 | Johannesen | 180/8 |
| 3,145,797 A | 8/1964 | Taylor | 180/21 |
| 3,260,324 A | 7/1966 | Suarez | 180/10 |
| 3,288,234 A | 11/1966 | Feliz | 180/6.5 |
| 3,348,158 A | 10/1967 | Forsyth et al. | 115/1 |
| 3,374,845 A | 3/1968 | Selwyn | 180/6.5 |
| 3,399,742 A | 9/1968 | Malick | 180/21 |
| 3,446,304 A | 5/1969 | Alimanestiano | 180/9.24 |
| 3,450,219 A | 6/1969 | Fleming | 180/8 |
| 3,515,401 A | 6/1970 | Gross | 280/5.26 |
| 3,580,344 A | 5/1971 | Floyd | 180/8 A |
| 3,596,298 A | 8/1971 | Durst, Jr. | 5/81 |
| 3,860,264 A | 1/1975 | Douglas et al. | 280/266 |
| 3,872,945 A | 3/1975 | Hickman et al. | 180/65 R |
| 3,952,822 A | 4/1976 | Udden et al. | 180/21 |
| 4,018,440 A | 4/1977 | Deutsch | 272/70.3 |
| 4,062,558 A | 12/1977 | Wasserman | 280/205 |
| 4,076,270 A | 2/1978 | Winchell | 280/220 |
| 4,088,199 A | 5/1978 | Trautwein | 180/25 R |
| 4,094,372 A | 6/1978 | Notter | 180/1 G |
| 4,109,741 A | 8/1978 | Gabriel | 180/21 |
| 4,111,445 A | 9/1978 | Haibeck | 280/79 |
| 4,151,892 A | 5/1979 | Francken | 180/77 H |
| 4,222,449 A | 9/1980 | Feliz | 180/8 A |
| 4,264,082 A | 4/1981 | Fouchey, Jr. | 280/5.26 |
| 4,266,627 A | 5/1981 | Lauber | 180/8 B |
| 4,293,052 A | 10/1981 | Daswick et al. | 180/219 |
| 4,325,565 A | 4/1982 | Winchell | 280/282 |
| 4,354,569 A | 10/1982 | Eichholz | 180/211 |
| 4,363,493 A | 12/1982 | Veneklasen | 280/11.2 |
| 4,373,600 A | 2/1983 | Buschbom et al. | 180/212 |
| 4,375,840 A | 3/1983 | Campbell | 180/6.5 |
| 4,510,956 A | 4/1985 | King | 135/67 |
| 4,560,022 A | 12/1985 | Kassai | 180/65.1 |
| 4,566,707 A | 1/1986 | Nitzberg | 180/8.2 |
| 4,570,078 A | 2/1986 | Yashima et al. | 307/10 R |
| 4,571,844 A | 2/1986 | Komasaku et al. | 33/366 |
| 4,624,469 A | 11/1986 | Bourne, Jr. | 280/112 A |
| 4,657,272 A | 4/1987 | Davenport | 280/266 |
| 4,685,693 A | 8/1987 | Vadjunec | 280/242 WC |
| 4,709,772 A | 12/1987 | Brunet | 180/8.2 |
| 4,716,980 A | 1/1988 | Butler | 180/19.2 |
| 4,740,001 A | 4/1988 | Torleumke | 280/11.115 |
| 4,746,132 A | 5/1988 | Eagan | 280/1.13 |
| 4,770,410 A | 9/1988 | Brown | 272/70.3 |
| 4,786,069 A | 11/1988 | Tang | 280/221 |
| 4,790,400 A | 12/1988 | Sheeter | 180/8.6 |
| 4,790,548 A | 12/1988 | Decelles et al. | 280/5.26 |
| 4,794,999 A | 1/1989 | Hester | 180/8.2 |
| 4,798,255 A | 1/1989 | Wu | 180/65.1 |
| 4,802,542 A | 2/1989 | Houston et al. | 180/65.5 |
| 4,809,804 A | 3/1989 | Houston et al. | 180/65.5 |
| 4,834,200 A | 5/1989 | Kajita | 180/8.1 |
| 4,863,182 A | 9/1989 | Chern | 280/266 |
| 4,867,188 A | 9/1989 | Reid | 135/67 |
| 4,869,279 A | 9/1989 | Hedges | 135/67 |
| 4,874,055 A | 10/1989 | Beer | 180/19.2 |
| 4,890,853 A | 1/1990 | Olson | 280/87.021 |
| 4,919,225 A | 4/1990 | Sturges | 180/210 |
| 4,953,851 A | 9/1990 | Sherlock et al. | 272/70.3 |
| 4,958,947 A | 9/1990 | Peter et al. | 384/609 |
| 4,984,754 A | 1/1991 | Yarrington | 244/2 |
| 4,985,947 A | 1/1991 | Ethridge | 5/81 |
| 4,998,596 A | 3/1991 | Miksitz | 180/213 |
| 5,002,295 A | 3/1991 | Lin | 280/205 |
| 5,011,171 A | 4/1991 | Cook | 280/221 |
| 5,052,237 A | 10/1991 | Reimann | 74/335 |
| 5,111,899 A | 5/1992 | Reimann | 180/65.1 |
| 5,158,493 A | 10/1992 | Morgrey | 446/355 |
| 5,168,947 A | 12/1992 | Rodenborn | 180/19.1 |
| 5,171,173 A | 12/1992 | Henderson et al. | 440/7 |
| 5,186,270 A | 2/1993 | West | 180/6.62 |
| 5,221,883 A | 6/1993 | Takenaka et al. | 318/568.12 |
| 5,241,875 A | 9/1993 | Kochanneck | 74/479 BP |
| 5,248,007 A | 9/1993 | Watkins et al. | 180/9.32 |
| 5,314,034 A | 5/1994 | Chittal | 180/21 |
| 5,350,033 A | 9/1994 | Kraft | 180/167 |
| 5,366,036 A | 11/1994 | Perry | 180/65.1 |
| 5,376,868 A | 12/1994 | Toyoda et al. | 318/587 |
| 5,419,624 A | 5/1995 | Adler et al. | 303/112 |
| 5,701,965 A | 12/1997 | Kamen et al. | 180/7.1 |
| 5,701,968 A | 12/1997 | Wright-Ott et al. | 180/65.1 |
| 5,775,452 A | 7/1998 | Patmont | 180/181 |
| 5,791,425 A | 8/1998 | Kamen et al. | 180/7.1 |
| 5,794,730 A | 8/1998 | Kamen | 180/7.1 |
| 5,971,091 A | 10/1999 | Kamen et al. | 180/218 |
| 5,973,463 A | 10/1999 | Okuda et al. | 318/430 |
| 5,975,225 A | 11/1999 | Kamen et al. | 180/7.1 |
| 5,986,221 A | 11/1999 | Stanley | 177/136 |
| 6,003,624 A | 12/1999 | Jorgensen et al. | 180/6.5 |
| 6,039,142 A | 3/2000 | Eckstein et al. | 180/333 |
| 6,050,357 A | 4/2000 | Staelin et al. | 180/65.1 |
| 6,059,062 A | 5/2000 | Staelin et al. | 180/181 |
| 6,125,957 A | 10/2000 | Kauffmann | 180/65.1 |
| 6,131,057 A | 10/2000 | Tamaki et al. | 701/22 |
| 6,223,104 B1 | 4/2001 | Kamen et al. | 701/1 |
| 6,225,977 B1 | 5/2001 | Li | 345/156 |
| 6,288,505 B1 | 9/2001 | Heinzmann et al. | 318/139 |
| 6,302,230 B1 | 10/2001 | Kamen et al. | 180/171 |
| 6,311,794 B1 | 11/2001 | Morrell et al. | 180/8.3 |
| 6,332,103 B1 | 12/2001 | Steenson, Jr. et al. | 701/1 |
| 6,538,411 B1 | 3/2003 | Field et al. | 318/638 |
| 6,553,271 B1 | 4/2003 | Morrell | 700/75 |
| 6,571,892 B2 | 6/2003 | Kamen et al. | 180/8.2 |
| 6,581,714 B1 | 6/2003 | Kamen et al. | 180/333 |
| 6,789,640 B1 | 9/2004 | Arling et al. | 180/282 |
| 2002/0063006 A1 | 5/2002 | Kamen et al. | 180/171 |
| 2002/0121394 A1 | 9/2002 | Kamen et al. | 180/41 |
| 2003/0014167 A1 | 1/2003 | Pedersen et al. | 701/37 |
| 2003/0226698 A1 | 12/2003 | Kamen et al. | 180/65.1 |

FOREIGN PATENT DOCUMENTS

| | | | |
|---|---|---|---|
| DE | 31 28 112 A1 | 2/1983 | |
| DE | 32 42 880 A1 | 6/1983 | |
| DE | 3411489 A1 | 10/1984 | |
| DE | 44 04 594 A1 | 8/1995 | |
| DE | 196 25 498 C1 | 11/1997 | |
| DE | 298 08 091 U1 | 10/1998 | |
| DE | 298 08 096 U1 | 10/1998 | |
| EP | 0 109 927 | 7/1984 | |
| EP | 0 193 473 | 9/1986 | |
| EP | 0 537 698 | 4/1993 | |
| EP | 0 958 978 | 11/1999 | |
| FR | 980 237 | 5/1951 | 10/1 |
| FR | 2 502 090 | 9/1982 | |
| FR | 82 04314 | 9/1982 | |
| GB | 2388579 | 11/1903 | |
| GB | 152664 | 2/1922 | |
| GB | 1213930 | 11/1970 | |
| GB | 2 139 576 A | 11/1984 | |
| JP | 52-44933 | 10/1975 | |
| JP | 57110569 | 7/1982 | |
| JP | 59-73372 | 4/1984 | |
| JP | 62-12810 | 7/1985 | |
| JP | 0255580 | 12/1985 | |
| JP | 61-31685 | 2/1986 | |
| JP | 63-305082 | 12/1988 | |
| JP | 21-90277 | 7/1990 | |
| JP | 57-87766 | 6/1992 | |
| JP | 4201793 | 7/1992 | |
| JP | 52-13240 | 8/1993 | |
| JP | 6171562 | 6/1994 | |

| JP | 6105415 | 12/1994 |
| JP | 7255780 | 3/1995 |
| WO | 86/05752 | 10/1986 |
| WO | 89/06117 | 7/1989 |
| WO | 96/23478 | 8/1996 |
| WO | 98/46474 | 10/1998 |
| WO | 2004/007264 | 1/2000 |
| WO | 00/75001 | 12/2000 |

OTHER PUBLICATIONS

Schoonwinkel, A., Design and Test of a Computer-Stabilized Unicycle, *Dissertation Abstracts International*, vol. 49/03-B, Stanford University 1988, pp. 890-1294.

Vos, D., *Dynamics and Nonlinear Adaptive Control of an Autonomous Unicycle*, Massachusetts Institute of Technology, 1989.

Vos, D., *Nonlinear Control of an Autonomous Unicycle Robot: Practical Issues*, Massachusetts Institute of Technology, 1992.

Koyanagi et al., A Wheeled Inverse Pendulum Type Self-Contained Mobile Robot and its Posture Control and Vehicle Control, *The Society of Instrument and Control Engineers*, Special Issue of the $31^{st}$ SICE Annual Conference, Japan, 1992, pp. 13-16.

Koyanagi et al., A Wheeled Inverse Pendulum Type Self-Contained Mobile Robot and its Posture Control and Vehicle Control, *The Society of Instrument and Control Engineers*, Special Issue of the $31^{st}$ SICE Annual Conference, Japan, 1992, pp. 51-56.

Koyanagi et al., A Wheeled Inverse Pendulum Type Self-Contained Mobile Robot and its Two Dimensional Trajectory Control, *Proceeding of the Second International Symposium on Measurement and Control in Robotics*, Japan 1992, pp. 891-898.

Watson Industries, Inc., Vertical Reference Manual ADS-C132-1A, 1992, pp. 3-4.

News article *Amazing Wheelchair Goes Up and Down Stairs*.

Osaka et al., Stabilization of unicycle, *Systems and Control*, vol. 25, No. 3, Japan 1981, pp. 159-166 (Abstract Only).

Roy et al., Five-Wheel Unicycle System, *Medical & Biological Engineering & Computing*, vol. 23, No. 6, United Kingdom 1985, pp. 593-596

Kawaji, S. Stablization of Unicycle Using Spinning Motion, *Denki Gakkai Ronbushi, D*, vol. 107, Issue 1, Japan 1987, pp. 21-28 (Abstract only).

Schoonwinkel, A., Design and Test of a Computer-Stabilized Unicycle, *Dissertation Abstracts International*, vol. 49/03-B, Stanford University 1988, pp. 890-1294 (Abstract only).

Vos et al., Dynamics and Nonlinear Adaptive Control of an Autonomous Unicycle—Theory and Experiment, *American Institute of Aeronautics and Astronautics*, A90-26772 10-39, Washington, D.C. 1990, pp. 487-494.

TECKNICO'S Home Page, *Those Amazing Flying Machines*, http://www.swiftsite.com/technico.

Stew'sHovercraft Page, http://www.stewcam.com/hovercraft.html.

Kanoh, Adaptive Control of Inverted Pendulum, *Computrol*, vol. 2, (1983), pp. 69-75.

Yamafuji, A Proposal for Modular-Structured Mobile Robots for Work that Principally Involve a Vehicle with Two Parallel Wheels, *Automation Technology*, vol. 20, pp. 113-118 (1998).

Yamafuji & Kawamura, Study of Postural and Driving Control of Coaxial Bicycle, *Paper Read at Meeting of Japan Society of Mechanical Engineering(Series C)*, vol. 54, No. 501, (May 1998), pp. 1114-1121.

Yamafuji et al., Sychronization and Steering Control of Parallel Bicycle, *Paper Read at Meeting of Japan Society of Mechanical Engineering (Series C)*, vol. 55, No. 513, (May 1989), pp. 1229-1234.

Momoi & Yamafuji, Motion Control of the Parallel Bicycle-Type Mobile Robot Composed of a Triple Inverted Pendulum, *Paper Read at Meeting of Japan Society of Mechanical Engineering (Series C)*, vol. 57, No. 541, (Sep. 1991), pp. 154-159.

Notification of Transmittal of the International Search Report of the Written Opinion of the International Searching Authority, *International Searching Authority*, pp. 1-14, Feb. 3, 2006.

VEHICLE CONTROL BY PITCH MODULATION

PRIORITY

This present application is a divisional application of U.S. patent application, Ser. No. 11/249,136, filed on Oct. 11, 2005, which claims priority from U.S. Provisional Patent Application, Ser. No. 60/617,244, filed Oct. 8, 2004, and U.S. patent application, Ser. No. 11/249,136, is also a continuation-in-part of U.S. patent application, Ser. No. 10/990,715, filed Nov. 17, 2004, which is a continuation of U.S. patent application, Ser. No. 10/460,053, now U.S. Pat. No. 6,827,163, filed Jun. 12, 2003, which claims priority to U.S. Provisional Patent Application, Ser. No. 60/388,723 filed Jun. 14, 2002, and U.S. patent application, Ser. No. 11/249,136, is also a continuation-in-part of U.S. patent application, Ser. No. 10/459,173, filed Jun. 11, 2003 which claims priority from U.S. Provisional Application, Ser. No. 60/387,641, filed Jun. 11, 2002. All of the above referenced patents and applications are hereby incorporated by reference in their entirety.

TECHNICAL FIELD

The present invention pertains to methods for actively maintaining stability and control of the motion of a vehicle equipped with one or more forward wheels and one or more aft wheels, whereby balanced operation may be enabled in case the front wheels lose, or are removed from, contact with the ground.

BACKGROUND OF THE INVENTION

Human transport devices serve to move a person over a surface and may take many different forms. For example, a human transport device, as the term is used herein, may include, but is not limited to, wheelchairs, motorized carts, all-terrain vehicles, bicycles, motorcycles, cars, hovercrafts, and the like. Some types of human transport may include stabilization mechanisms to help ensure that the device does not fall over and injure the user of the transport device.

A typical four-wheeled wheelchair contacts the ground with all four wheels. If the center of gravity of the combination of the wheelchair and the user remains over the area between the wheels, the wheelchair should not tip over. If the center of gravity is located above and outside of the ground contacting members of the transport device, the transport device may become unstable and tip over.

Referring now to FIG. 1A, a typical wheelchair 100 is shown. The wheelchair 100 and the user 102 define a frame. The frame has a center of gravity 104 located at a position vertically disposed above the surface 106. The term "surface" as it is used herein refers to any surface upon which a human transport device may sit or locomote. Examples of a surface include flat ground, an inclined plane such as a ramp, a gravel covered street, and may include a curb which vertically connects two substantially parallel surfaces vertically displaced from one another (e.g., a street curb).

The surface 106 may be at an incline as compared to the horizontal axis 108 (which is a line in the plane transverse to the local vertical). The angle by which the surface 106 is offset from the horizontal axis 108 is called the surface pitch and will be represented by an angle denoted as $\theta_s$.

The front wheel 112 and the rear wheel 110 of the wheelchair 100 are separated by a distance d. The distance d between the two wheels may be measured as a linear (e.g., straight line) distance. The wheels 110 and 112 typically have opposing counterparts (not shown) on the other side of the wheelchair. The opposing counterparts may each share an axis with wheels 110 and 112, respectively. The area covered by the polygon which connects the points where these four wheels touch the ground (or the outside portions of the ground contacting parts, when the ground contacting part may cover more than a point) provides an area over which the center of gravity 104 may be located while the wheelchair remains stable. This area may be referred to as the footprint of the device. The footprint of a device, as the term is used herein, is defined by the projection of the area between the wheels as projected onto the horizontal plane. If the center of gravity is above this location, the transport device should remain stable.

If the center of gravity 104 is vertically displaced above the surface 106 and outside the footprint (i.e., the projection of area between the wheels 110 and 112 onto the horizontal plane), wheelchair 100 may tip over. This could happen, for example, when the wheelchair is on a surface that has a steep incline, or, alternatively, if the user 'pops a wheelie' in order to surmount a curb, for example. When on a steep incline, the center of gravity 104 may shift back and cause the wheelchair 100 to flip over backwards. This is shown in FIG. 1B where the center of gravity 104 is located at a position that is outside the footprint of the wheelchair 100. The center of gravity 104 is shown including a gravity acceleration vector (g) which linearly translates the center of gravity 104 in a downward direction. The wheelchair 100 may rotate about an axis of the rear wheel 110 until the wheelchair 100 contacts the surface being traversed.

User 102 may help to return the center of gravity 104 to a location that is above the area between the wheels 110 and 112 by leaning forward in the wheelchair 100. Given this limited control of the location of the center of gravity 104, it is clear that human transport devices such as wheelchairs may encounter great difficulties when traversing uneven surfaces such as a curb or steps.

Some vehicles, by virtue of their weight distribution or typical modes of operation are prone to fore-aft instability and end-over-end ("endo") rollovers. In operation of an all-terrain vehicle (ATV), for example, it is not always possible or desirable to maintain all wheels of the vehicle in contact with the underlying surface at all times. Yet, it is desirable to preclude loss of control of the vehicle or end-over-end rollover. ATVs may benefit from stabilization in one or more of the fore-aft or left-right planes, especially under conditions in which fewer than a stable complement of wheels are in contact with the ground. Vehicles of this sort may be more efficiently and safely operated employing control modes supplementary to those described in the prior art.

SUMMARY OF THE INVENTION

In accordance with preferred embodiments of the present invention, a method is provided for fore-aft stabilization of a vehicle for motion in a specified direction over an underlying surface, where the vehicle having a plurality of driven wheels including a forward wheel and an aft wheel, and with the forward wheel characterized by a force normal to the instantaneous direction of motion of the vehicle. The method has the step of applying a torque to the aft wheel based on the force on the forward wheel normal to the direction of motion and/or the instantaneously sensed tilt of the vehicle.

In accordance with other embodiments of the invention, the method may have additional steps of applying a periodic torque to at least one of the wheels for inducing a small pitch modulation, detecting pitch variation of the vehicle in response to the applied periodic torque, and applying a stabilizing torque to the aft wheel on the basis, at least, of any detected pitch variation in response to the applied periodic torque.

In accordance with yet further embodiments of the invention, an apparatus is provided for pitch stabilization of the motion of a vehicle having at least one forward wheel and at least one aft wheel. The apparatus has a sensor for sensing a force on the forward wheel normal to an instantaneous direction of motion of the vehicle, a motor actuator for driving the aft wheel, and a controller for applying a torque to the aft wheel on the basis of a control law based at least on the normal force on the forward wheel.

In accordance with another aspect of the present invention, a stabilized vehicle is provided that has at least one forward wheel and at least one aft wheel. Additionally, the vehicle has a sensor for sensing a force on the forward wheel normal to an instantaneous direction of motion of the vehicle, and/or an instantaneous pitch of the vehicle and/or a function of the instantaneous pitch. The vehicle also has a motor actuator for driving the aft wheel, and a controller for applying a torque to the aft wheel on the basis of a control law based at least on the normal force on the forward wheel. The vehicle may include a pedal-driven bicycle, a motorcycle, or a wheelchair.

In accordance with yet further embodiments of the present invention, there is provided a vehicle with a plurality of wheels, including at least one forward wheel and at least one aft wheel. A motor actuator drives each aft wheel, and a controller governs the motor actuator or motor actuators in such a manner as to dynamically stabilize the vehicle when the forward wheel is not in contact with the underlying surface. More particularly, a left aft actuator drives a left aft wheel independently of the right aft wheel, thus the controller can govern differential rotation of the left and right aft wheels for controlling yaw of the vehicle whether a forward wheel is in contact with the ground, or not.

In accordance with further embodiments of the invention, the controller is such as to govern the motor actuator according to a control law independent of whether the forward wheel is in contact with the underlying surface. The vehicle may further have a user input device for providing a throttle output signal, and a pitch sensor for providing a pitch signal. The controller may then govern the motor actuator according to a control law based at least upon the throttle output signal or the pitch signal or a pitch rate signal. More particularly, the controller may govern the motor actuator according to a control law based at least upon the pitch signal when the vehicle pitch angle exceeds a specified value.

In accordance with a further embodiment of the invention, there is provided a vehicle that includes a first fore-wheel coupled to a first pivot point by a first strut and a second fore-wheel coupled to the first pivot point by a second strut. The vehicle of this embodiment also includes at least one aft-wheel coupled to the first pivot point. In this embodiment, the first and second struts are spaced apart from one another and are arranged and configured to cause the vehicle to vary its direction of motion by causing the first fore-wheel and the second fore-wheel to both pivot about at least their respective vertical or inclined axis.

In accordance with a further embodiment of the invention, there is provided a vehicle that includes a central pivot. The vehicle also includes a first fore-wheel coupled to the central pivot point by a first strut, the first strut being arranged and configured to rotate about the central pivot during operation and a second fore-wheel coupled to the central pivot by a second strut, the second strut being arranged and configured to rotate about the central pivot during operation. The vehicle of this embodiment also includes at least one aft-wheel coupled to the central pivot by a connecting member arranged configured to retain a fixed orientation with respect to the central pivot.

In accordance with a further embodiment of the invention, there is provided a vehicle that includes a plurality of wheels, including at least one forward wheel and at least two aft wheels. The vehicle of this embodiment also includes at least one motor actuator that drives each aft wheel and at least one yaw controller. The vehicle of this embodiment also includes a controller that controls the at least one motor actuator such that a direction imparted on the at least one forward wheel by the yaw controller is replicated by differential rotation of the at least two aft wheels.

In accordance with a further embodiment of the invention, there is provided a vehicle that includes a plurality of wheels, including at least one forward wheel and at least two aft wheels. The vehicle of this embodiment also includes at least one motor actuator that drives each aft wheel and at least one yaw controller. The vehicle of this embodiment may also include a throttle and a controller that, when all of the plurality of wheels is in contact with a surface being traversed, causes the vehicle to accelerate when the throttle is rotated and that, when the at least one forward wheel is not in contact with a surface being traversed, causes an offset from a pitch limit to be adjusted when the throttle is rotated.

BRIEF DESCRIPTION OF THE DRAWINGS

The invention will be more readily understood by reference to the following description, taken with the accompanying drawings, in which.

DETAILED DESCRIPTION OF SPECIFIC EMBODIMENTS

Definitions:

A vehicle may be said to act as "balancing" if it is capable of operation on one or more wheels but would be unable to stand on those wheels alone, but for operation of a control loop governing operation of the wheels. A balancing vehicle, when operated in a balancing mode, lacks static stability but is dynamically balanced. The wheels, or other ground-contacting elements, that provide contact between such a vehicle and the ground or other underlying surface, and minimally support the transporter with respect to tipping during routine operation, are referred to herein as "primary wheels." "Stability" as used in this description and in any appended claims refers to the mechanical condition of an operating position with respect to which the system will naturally return if the system is perturbed away from the operating position in any respect. The term "system" refers to all mass caused to move due to motion of the wheels with respect to the surface over which the vehicle is moving, and thus includes both the vehicle and the rider.

The term "lean" is often used with respect to a system balanced on a single point of a perfectly rigid member. In that case, the point (or line) of contact between the member and the underlying surface has zero theoretical width. In that case, furthermore, lean may refer to a quantity that expresses the orientation with respect to the vertical (i.e., an imaginary line passing through the center of the earth) of a line from the center of gravity (CG) of the system through the theoretical line of ground contact of the wheel. Recognizing that the tire of an actual wheel is not perfectly rigid, the term "lean" is used herein in the common sense of a theoretical limit of a rigid ground-contacting member.

Figure 1A:
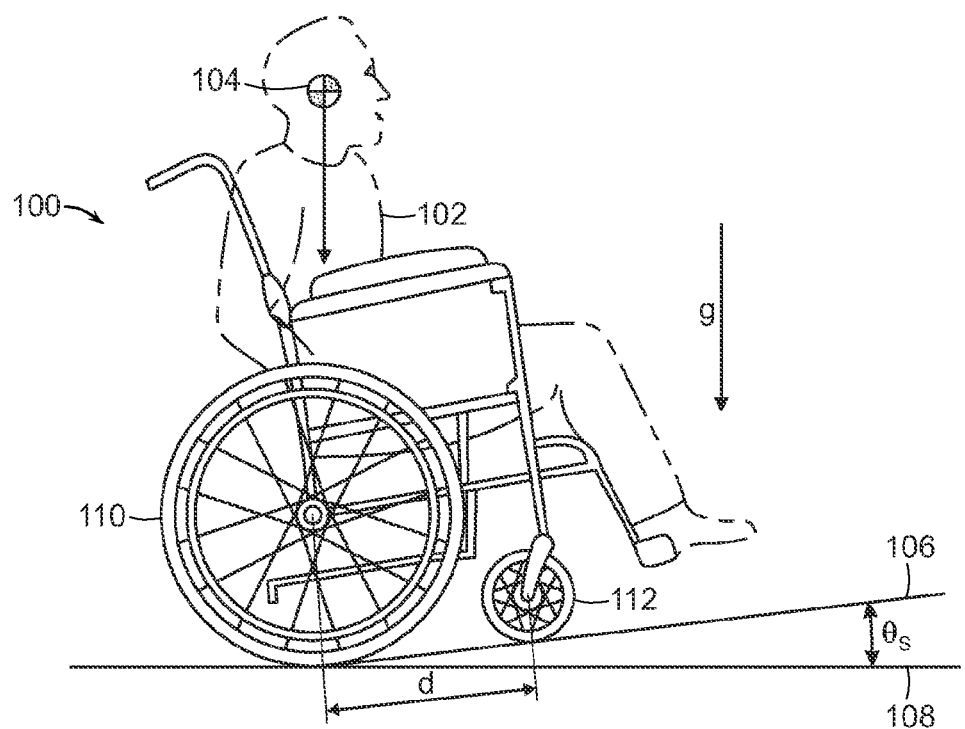
FIGS. 1A and 1B are schematic side views of a prior art personal vehicle of the type in which an embodiment of the invention may be advantageously employed.
Figure 1B:
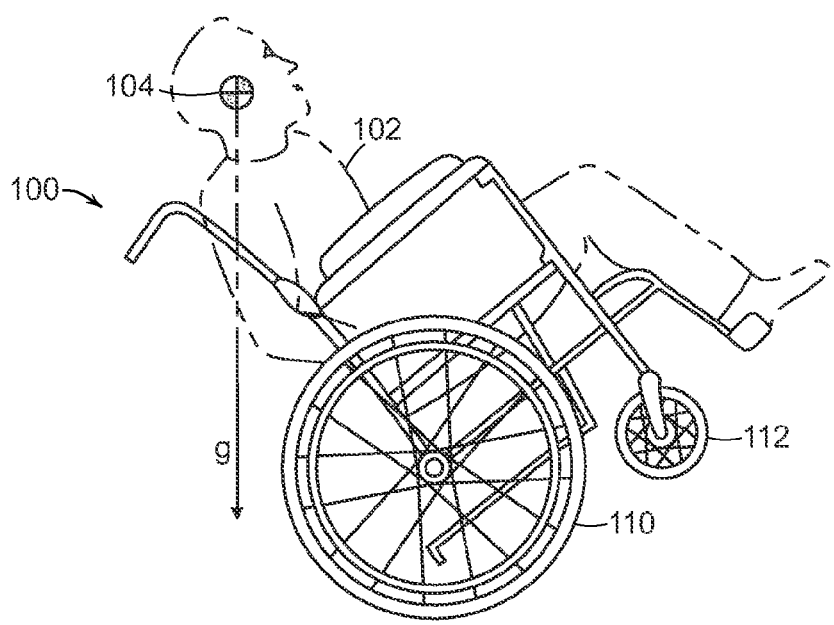
Figure 2:
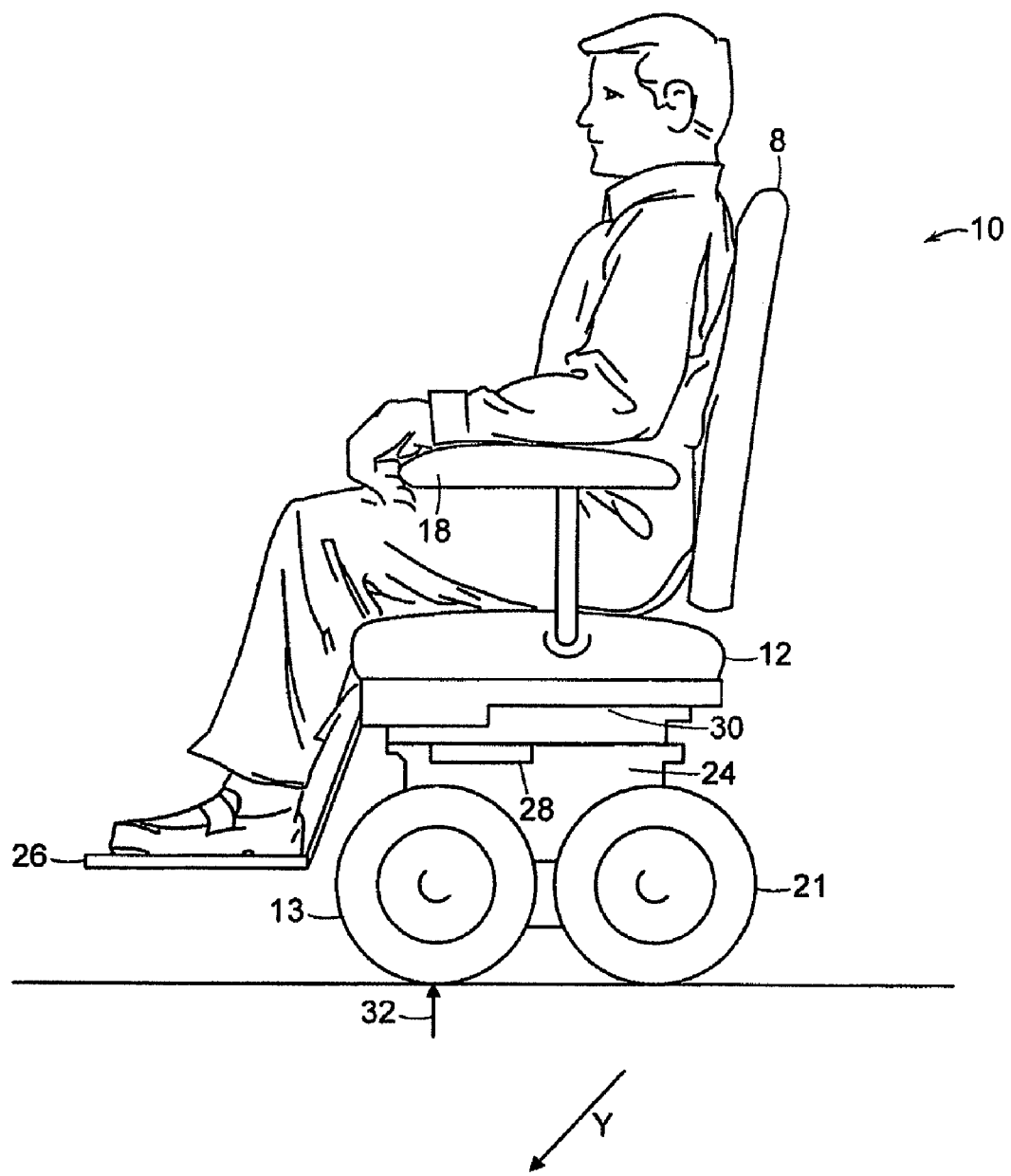
FIG. 2 is a diagram of typical components of a personal vehicle of the type in which an embodiment of the invention may be advantageously employed indicating the variables used in the description of specific embodiments of the present invention.

Operation in Accordance with Embodiments of the Invention:

One embodiment of a stabilized vehicle in accordance with the present invention is depicted in FIG. 2 and designated generally by numeral 10. User 8, as shown in FIG. 2, is seated position on user support 12 of vehicle 10, though it is to be understood that user 8 may be supported otherwise than by sitting on a seat, and may, for example, within the scope of the present invention, be standing on a user support in the form of a platform.

Aft wheels 21 (of which only one is visible in the side-view of FIG. 2) are coaxial about an axis defined as the Y axis. Each of rear wheels 21 is driven by a motor actuator (not shown) disposed within a power base 24 such that steering may be effectuated through differential torque applied to respective rear wheels 21. Compensating, by differential actuation of the rear wheels for the increased rotational travel of the outer wheel on a turn may be referred to herein as an "active differential." Rider 8 may be supported on vehicle 10 in various body positions, thereby controlling the position of the center of mass of the vehicle, as governed by the distribution of weight of the load, namely the user. For example, user 8 may be seated, as shown in FIG. 2, on seat 12, with his feet resting on footrest 26.

The embodiment shown of vehicle 10, additionally, has two forward wheels 13 (of which one is visible in the side view of FIG. 2), typically in contact with the ground during ordinary operation. Forward wheel 13 and one or more other forward wheels may be mounted on a common axle or otherwise, and pivoting of any of the forward wheels is within the scope of the present invention. Personal vehicles designed for enhanced maneuverability and safety may also include one or more clusters of wheels, with the cluster and the wheels in each cluster capable of being motor-driven independently of each other. Such vehicles are described in U.S. Pat. Nos. 5,701,965, 5,971,091, 6,302,230, 6,311,794, and 6,553,271, all of which patents are incorporated herein by reference.

Controller 30 provides for stability of the vehicle by continuously sensing the orientation of the vehicle and the commanded velocity, as described in detail below, determining the corrective action to maintain stability, and commanding the wheel motors to make any necessary corrective action.

In accordance with preferred embodiments of the present invention, the same control law is applied whether or not forward wheels of the vehicle are in contact with the ground.

Steering or other control may be provided by means of a user input device 18, which may be a joystick, handlebars or by any other user input mechanisms. A variety of steering devices which are further examples of user input mechanisms that may be employed within the scope of the present invention are described in U.S. Pat. Nos. 6,581,714 and 6,789,640, which are incorporated herein by reference.

A sensor unit 28 is provided as part of power base 24 for providing one or more sensor signals to controller 30. Sensor unit 28 may provide a measure of pitch rate and/or pitch of the vehicle, and may employ inertial sensing of the type described in detail in U.S. Pat. No. 6,332,103, which is incorporated herein by reference. Alternatively, or additionally, sensor unit 28 may include a force sensor for measuring the force (designated by arrow 32) normal to the underlying surface that is exerted on the underlying surface by wheel 13 (and, reciprocally, on the wheel by the underlying surface). Force sensors, such as those based on piezoresistors, are well-known in the art, and any kind of force sensor is within the scope of the present invention.

A simplified control algorithm for achieving balance in the embodiment of the invention according to FIG. 2 is now described. The control algorithm is described for the case of a single driven wheel, as may be employed for stabilization of an in-line bicycle or motorcycle. The generalization to the case of multiple driven wheels is discussed in detail below.

To achieve dynamic control to insure stability of the system, the wheel torque T in this embodiment is governed by the following simplified control equation:

$$T = K_1(\theta) \cdot (\theta - \theta_0) + K_2 \cdot \dot{\theta} + K_3 \cdot (v - v_{command}) + K_4 \cdot \int (v - v_{command}) dt + A \cdot f(\omega t), \quad \text{(Eqn. 1)}$$

where:

T denotes a torque applied to a ground-contacting element about its axis of rotation;

$K_1(\theta)$ is a gain function that may depend, as discussed below, on the instantaneous value of lean $\theta$;

$\theta$ is a quantity corresponding to the lean of the entire system about the ground contact region beneath the common axis Y of the rear wheels, with $\theta_0$ representing the magnitude of a system pitch offset, all as discussed in detail below;

v identifies the fore-aft velocity along the surface, with $v_{command}$ representing the magnitude of a user input such as a throttle constituted by user input (e.g., joystick) 18;

a dot over a character denotes a variable differentiated with respect to time; and a subscripted variable denotes a specified offset that may be input into the system as described below; and $K_1$, $K_2$, $K_3$ and $K_4$ are gain functions or coefficients that may be configured, either in design of the system or in real-time, on the basis of a current operating mode and operating conditions as well as preferences of a user. The gain coefficients may be of a positive, negative, or zero magnitude. The gains $K_1$, $K_2$, $K_3$ and $K_4$ are dependent upon the physical parameters of the system and other effects such as gravity. The simplified control algorithm of Eqn. 1 maintains balance of the vehicle in the presence of changes to the system's center of mass due to body motion of the rider or features of the underlying terrain.

The final term of Eqn. (1) allows for application of a periodic driving component, of period $2\pi/\omega$, and amplitude A (which may be zero, in the case of no applied modulation), to the torque applied to the driven wheel. The periodic function $f(\omega t)$ may be a sinusoidal function, for example.

It should be noted that the amplifier control may be configured to control motor current (in which case torque T is commanded) or, alternatively, the voltage applied to the motor may be controlled, in which case the commanded parameter is velocity.

The effect of $\theta_0$ min the above control equation (Eqn. 1) is to produce a specified offset $\theta_0$ from the non-pitched position, $\theta=0$. Adjustment of $\theta_0$ will adjust the vehicle's offset from a non-pitched position. In some embodiments, pitch offset may be adjusted by the user. Alternatively, $\theta_0$ can be set by the control system of the vehicle as a method of limiting the speed and/or the performance of the vehicle. In a preferred embodiment of the invention, a backward tilting limit is imposed, with the gain function $K_1$ substantially zero until the tilting limit is approached. Thus, the rider is free to lean the vehicle backward by shifting his weight, and thus the center-of-mass of the vehicle system, backward, until the tilt limit is approached. Then, $K_1$ assumes a non-zero value, and a term appears in control equation (1) that tends to counteract further backward leaning of the vehicle.

The magnitude of $K_3$ determines the gain of the user input, and may advantageously be a non-linear function, providing, for example, greater sensitivity near zero velocity. The $K_2$ term provides for control based on the instantaneous pitch rate, $\dot{\theta}$, of the vehicle, as measured by a pitch rate sensor or by differentiation of a measured pitch.

The response of a normal force 32 measured by sensor 28 in response to the applied pitch modulation $Af(\omega t)$, may be used, in accordance with embodiments of the invention, to counteract further backward leaning of the vehicle and maintain contact of the forward wheel with the ground, or, alternatively, impose a limit on rearward tilt.

In order to accommodate two wheels instead of the one-wheel system that has been described with respect to Eqn. 1, separate motors may be provided for left and right wheels of the vehicle and the torque desired from the left motor and the torque to be applied by the right motor can be governed in the general manner described above. Additionally, tracking both the left wheel motion and the right wheel motion permits adjustments to be made to prevent unwanted turning of the vehicle and to account for performance variations between the two drive motors.

In accordance with preferred embodiments of the invention, differential drive of the two rear wheels tracks turns according to the same yaw input as applied, via mechanical linkages, to the front wheels. This operation is described below, with reference to FIGS. 10 and 11.

Figure 3:
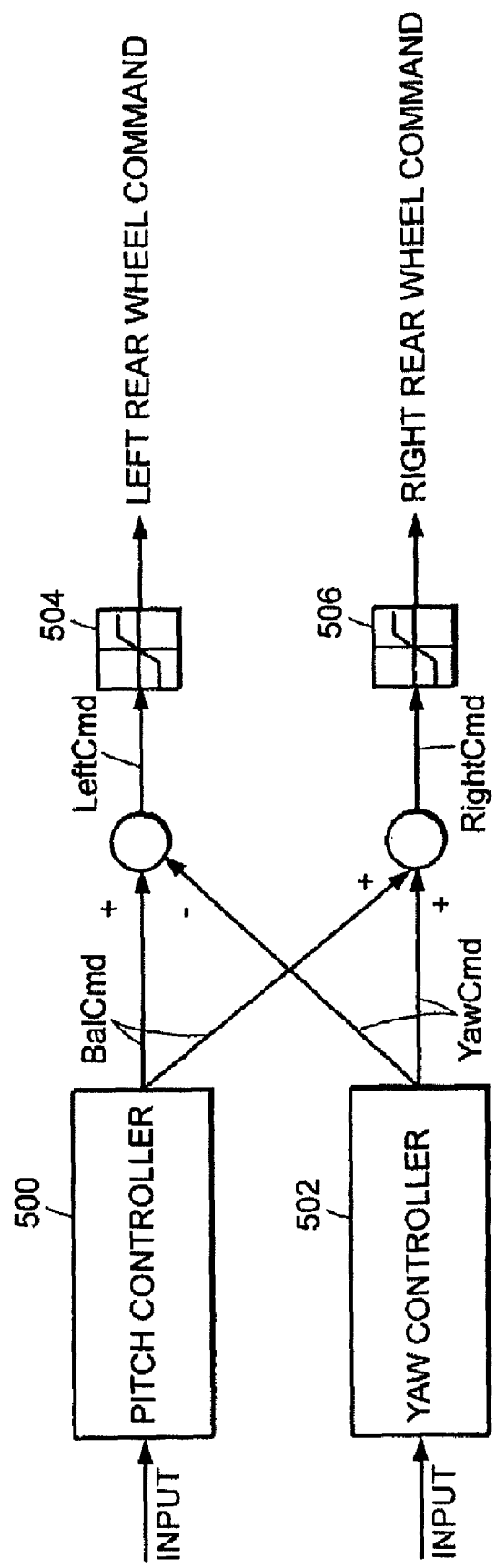
FIG. 3 is a block diagram depicting the coupling of pitch and yaw controller outputs for generation of wheel amplifier commands.

Referring now to FIG. 3, steering, or yaw control, of the vehicle may be accomplished by adding a turning command to the wheel amplifiers and have the following form. Inputs (described below) corresponding to values of vehicle parameters are used by Pitch Controller 500 and Yaw Controller 502 to derive a balance control signal BalCmd and a yaw control signal YawCmd according to algorithms discussed in the succeeding paragraphs.

$$leftCmd=BalCmd+YawCmd \quad (2)$$

$$RightCmd=BalCmd-YawCmd \quad (3)$$

The leftCmd and RightCmd are the command sent by the controllers 500 and 502 to the left and right motor amplifiers, respectively, after differentiation or other conditioning as appropriate. For instance and as shown by way of example in FIG. 3, the leftCmd and RightCmd's may be conditional, respectively, by differentiators 504 and 506. The leftCmd and RightCmd represent voltage if the amplifiers are in voltage control mode, current if the amplifiers are in current control mode, or duty cycle if the amplifiers are in duty cycle control mode. BalCmd is the command sent by the Pitch Controller 500 to each amplifier to maintain the transporter in a balanced state while moving or while at rest. The YawCmd causes the transporter to turn by reducing the command to one of the wheels while increasing the command to the other wheel. For example, a positive YawCmd increases the command to the left wheel while decreasing the command to the right wheel thereby causing the transporter to execute a right turn. The YawCmd may be generated by a yaw-input device described above with no feedback loop or in a closed cycle loop to correct yaw position errors as described in U.S. Pat. No. 6,288,505.

Figure 4A:
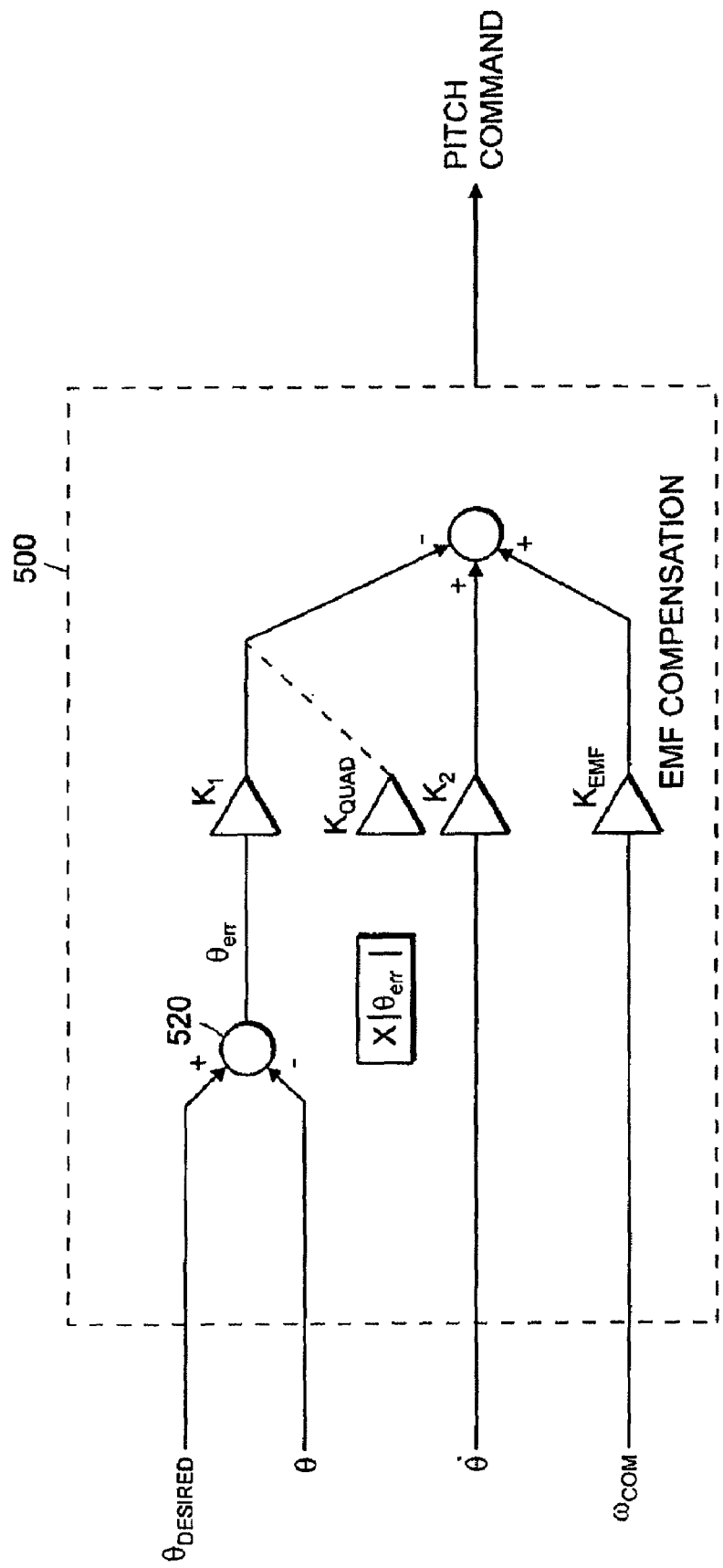
FIG. 4A is a block diagram showing the constitutive inputs of a pitch command in accordance with an embodiment of the present invention.

Pitch controller 500 is described in detail with reference to FIGS. 4A and 4B. The inputs include a desired pitch $\theta_{desired}$, the actual measured pitch $\theta$, the pitch rate $\dot{\theta}$, and the component of the wheel rotation velocity that is common to the two primary wheels, $\omega_{com}$. Both $\theta$ and $\dot{\theta}$ may be derived from inertial sensing, as described in U.S. Pat. No. 6,332,103, which is incorporated herein by reference.

Desired pitch $\theta_{desired}$ and current instantaneous pitch $\theta$ are differenced in summer 520 to produce a pitch error $\theta_{err}$. In accordance with certain embodiments of the present invention, pitch limiting is unilateral, such that a limit is provided on one end of a range of allowed values of pitch. If that pitch is exceeding, a restoring torque moves the vehicle in the direction of the pitch limit.

In accordance with some embodiments of the invention, the user may shift her weight backward, thereby 'popping' the vehicle into a two-wheeled balancing condition where stability is maintained until she shifts her weight forward to restore operation on all wheels.

Figure 4B:
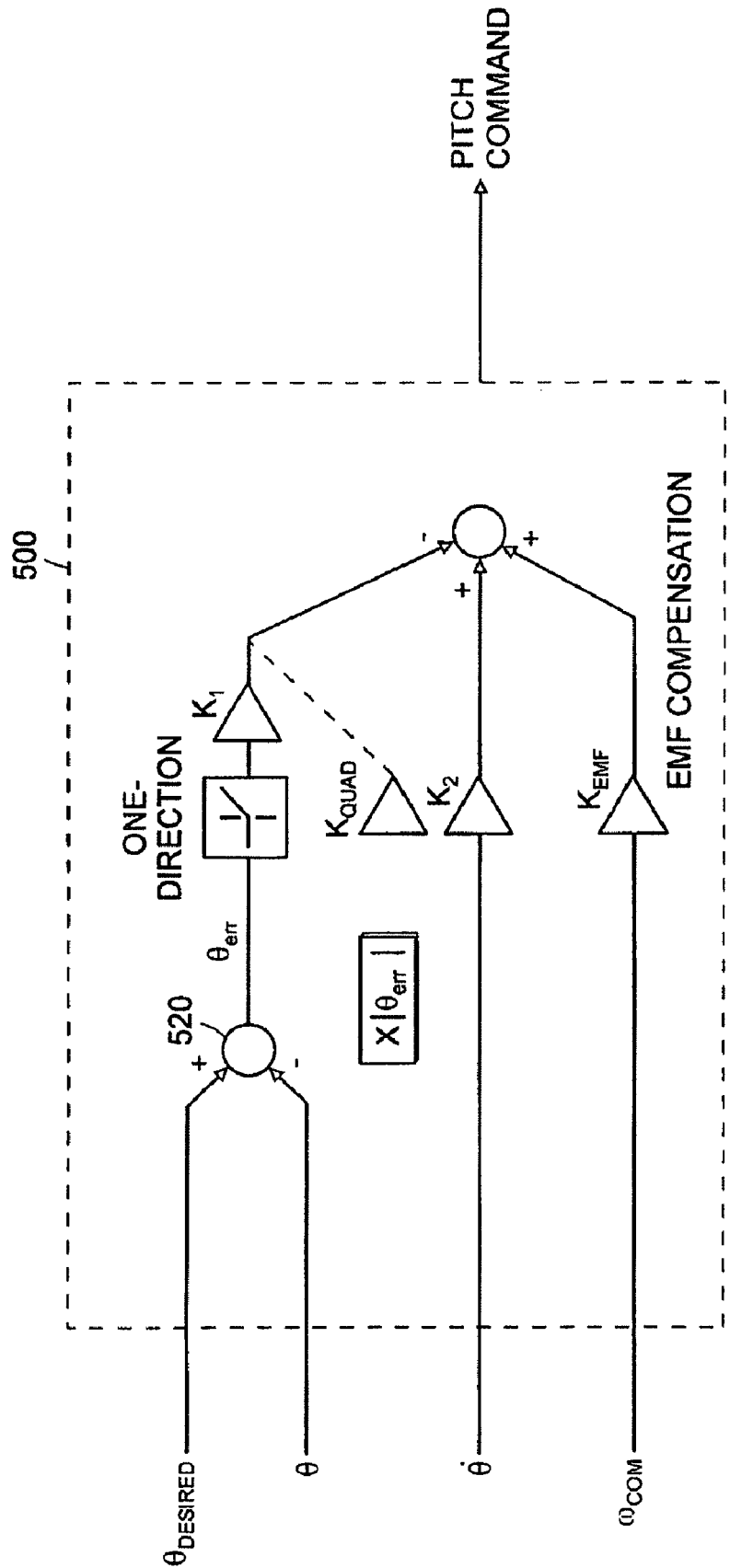
FIG. 4B is a block diagram showing the constitutive inputs of a pitch command with a unilateral limit in accordance with an embodiment of the present invention.

A term quadratic in pitch error $\theta_{err}$ (preserving the sign of the actual pitch error) may also be provided, as shown in FIG. 4B, thereby providing more intense response to large deviations in pitch as may result from encountering an obstacle, for example. In a voltage control mode, it is desirable to provide an additional term proportional to the wheel rotational velocity to compensate for all, or a portion, of the back-emf generated in proportion to the rotational velocity of the motors.

Figure 5A:
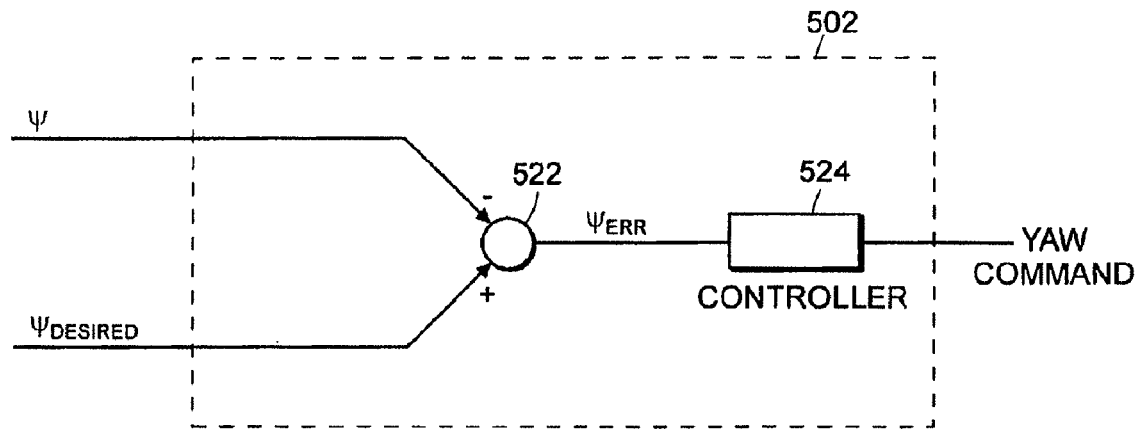
FIG. 5A is a block diagram showing the constitutive inputs of a yaw command in accordance with embodiments of the present invention.

Yaw controller 502 is described in detail with reference to FIGS. 5A-5C. FIG. 5A depicts the differencing, in summer 522, of the current yaw value $\psi$ with respect to the desired yaw value $\psi_{desired}$ to obtain the current yaw error $\psi_{err}$. Desired yaw value $\psi_{desired}$ is obtained from a user input such as joystick 18 or other user input device employed for directional input as discussed above. The current value of yaw is derived from various state estimates, such as the differential wheel velocities, inertial sensing, etc. Derivation of the yaw command from the yaw error is provided by controller 524 according to various processing algorithms.

Figure 5B:
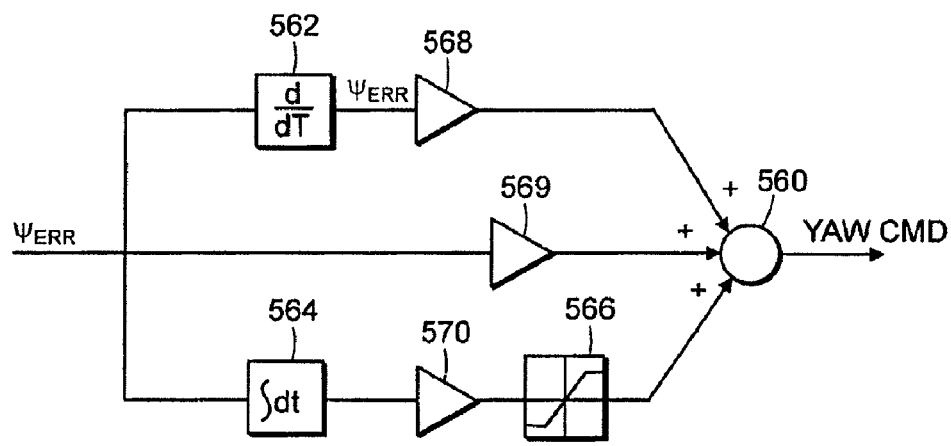
FIGS. 5B and 5C are block diagrams of different embodiments of a yaw controller in accordance with embodiments of the present invention.
Figure 5C:
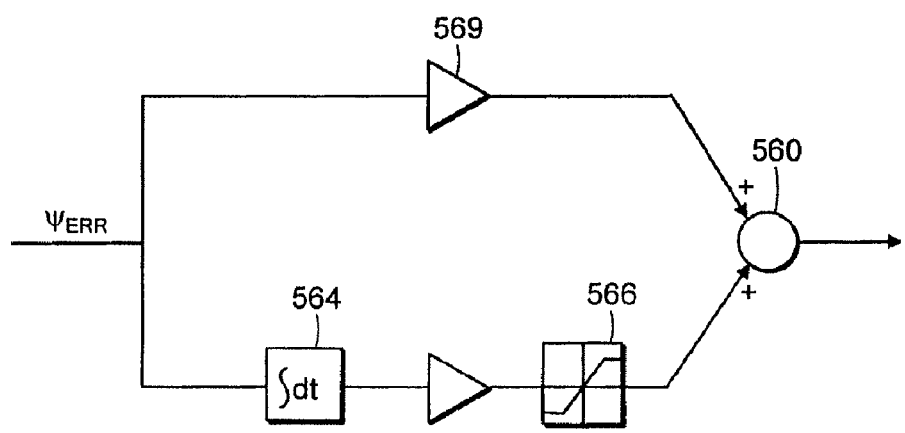

Two examples of yaw control algorithms are shown in FIGS. 5B and 5C. Specifically, FIG. 5B shows a control law implemented input signal $\psi_{err}$ is added, by summer 560, to the derivative of itself (output of differentiator 562) and the intergration of itself (output of integrator 564). Of course, and as shown by in FIG. 5B, each signal could have a gain applied to it (for example, by gain blocks 568, 569, and 570) or other signal processing such as smoother 566.

Another possibility is to simply omit the derivative signal as shown in FIG. 5C.

Of course, various controller transfer strategies may be implemented with proportional, derivative, and 'three term' 'PID' functions as depicted.

Figure 6:
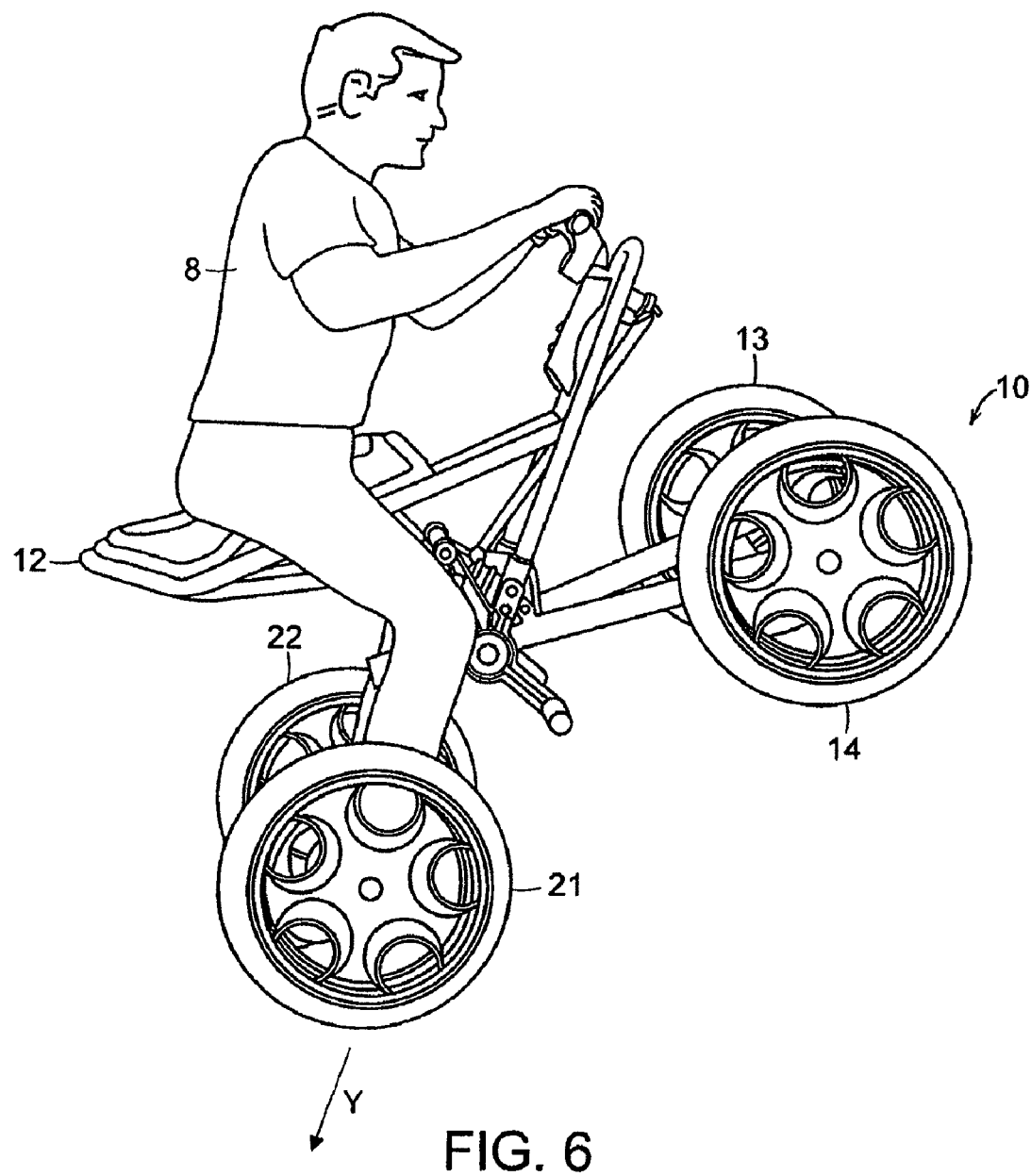
FIG. 6 is a side view of an all-terrain vehicle capable of balancing operation in accordance with one embodiment of the present invention.
Figure 7:
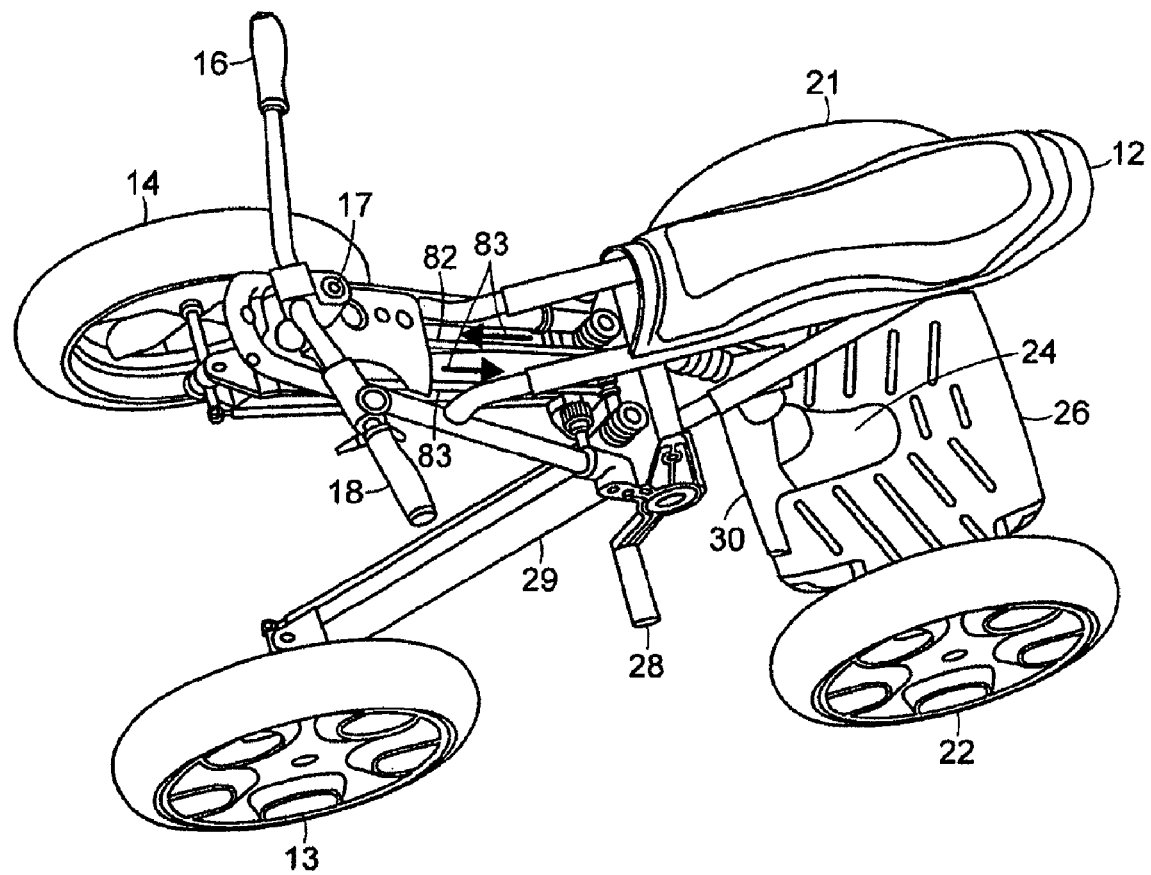
FIG. 7 is a perspective view from above of the embodiment of the invention of FIG. 6.
Figure 8:
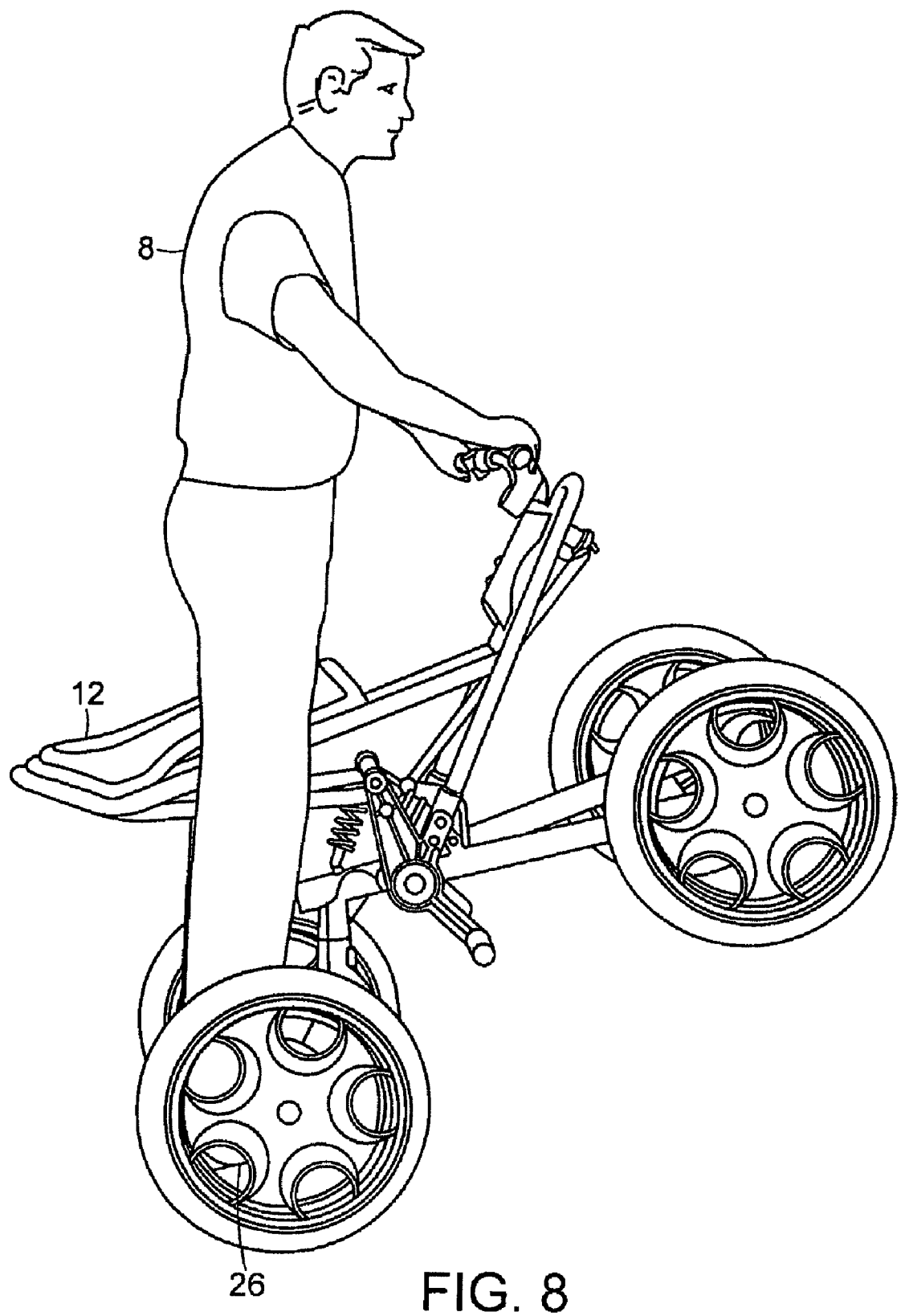
FIG. 8 is a further side view of the all-terrain vehicle of FIG. 6 showing operation by a standing user.
Figure 9:
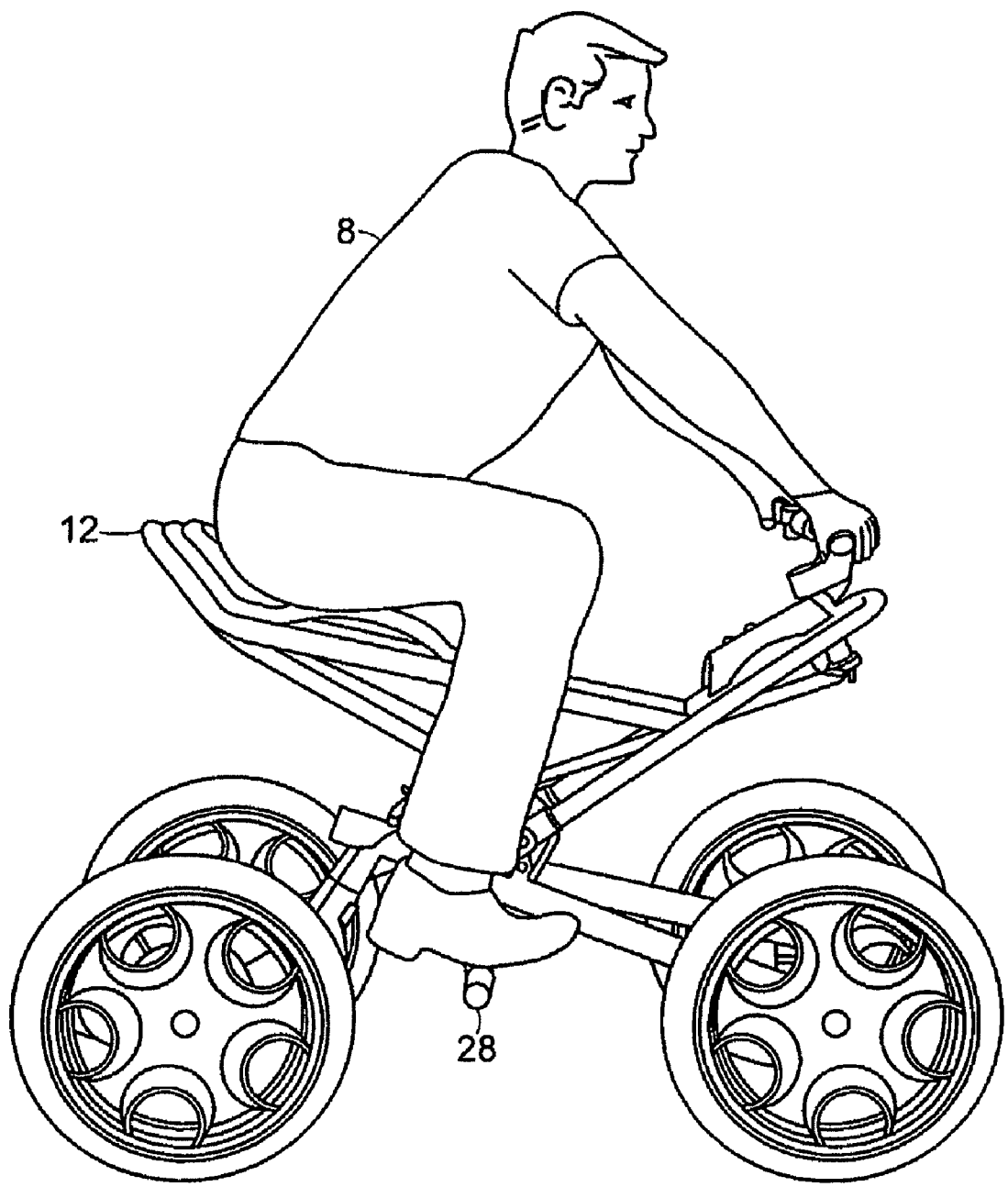
FIG. 9 is yet a further side view of the all-terrain vehicle of FIG. 6 showing operation by a seated user.

The present invention may also be embodied in a balancing all-terrain vehicle as depicted in FIG. 6 and designated generally by numeral 10. User 8, as shown in FIG. 6, is in a seated position on user support 12 of all-terrain vehicle 10. Aft wheels 21 and 22 are shown as coaxial about an axis defined as the Y axis. Referring now to the perspective view of all-terrain vehicle 10, from the top, shown in FIG. 7, each of rear wheels 21 and 22 is driven by a motor actuator 24 such that steering may be effectuated through differential torque applied to of rear wheels 21 and 22. Compensating, by differential actuation of the rear wheels for the increased rotational travel of the outer wheel on a turn may be referred to herein as an "active differential." Rider 8 may be supported on vehicle 10 in various body positions, thereby controlling the position of the center of mass of the vehicle, as governed by the distribution of weight of the load, namely the user. For example, user 8 may be seated, as shown in FIG. 6, on seat 12, with his feet resting on platform 26 (shown in FIG. 7), and may shift his weight relative to the vehicle by positioning himself along the length of seat 12. Alternatively, user 8 may stand on platform 26, with legs athwart seat 12, as shown in FIG. 8, or may sit on seat 12 with feet resting on foot rests 28, as shown in FIG. 9.

Referring again to FIG. 6, the embodiment shown of vehicle 10, additionally, has two forward wheels, 13 and 14, typically in contact with the ground during ordinary operation. In the embodiment of the invention shown, by way of example in FIG. 7, each forward wheel 13 and 14 is mounted on a separate suspension strut 29 such that each forward wheel is suspended independently of one another.

Controller 30 (shown in FIG. 7) provides for stability of the vehicle by continuously sensing the orientation of the vehicle and the commanded velocity, as has been described above, determining the corrective action to maintain stability, and commanding the wheel motors to make any necessary corrective action. In accordance with preferred embodiments of the present invention, the same control law may be applied whether or not forward wheels 13 and 14 of the vehicle 10 are in contact with the ground.

Steering or other control may be provided by the user's rotation of handlebar 18 (shown in FIG. 7) about pivot 17, or by any other user input mechanisms. A variety of steering devices which are further examples of user input mechanisms that may be employed within the scope of the present invention are described in U.S. Pat. Nos. 6,581,714 and 6,789,640, which are incorporated herein by reference. Handlebar 18 may also support user instruments and other user controls such as a throttle, within the scope of the invention.

Figure 10:
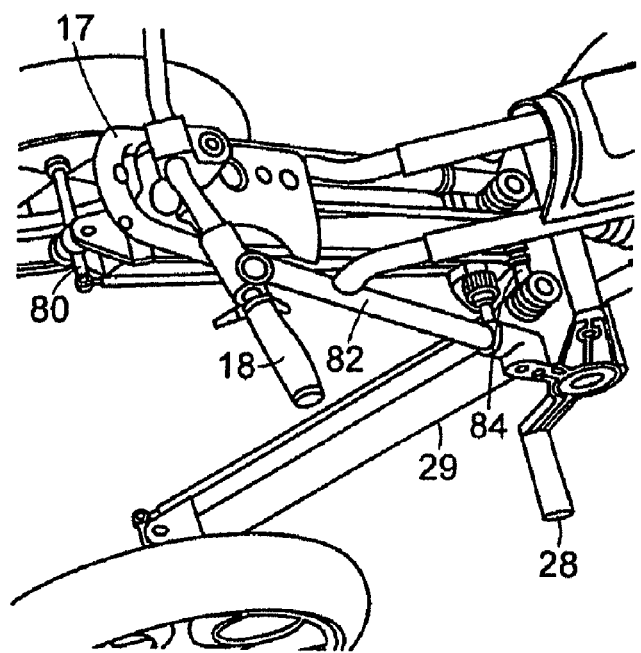
FIG. 10 shows the coupling of the handlebar to the upper pushrods for steering of the front wheels in accordance with a preferred embodiment of the invention.
Figure 11:
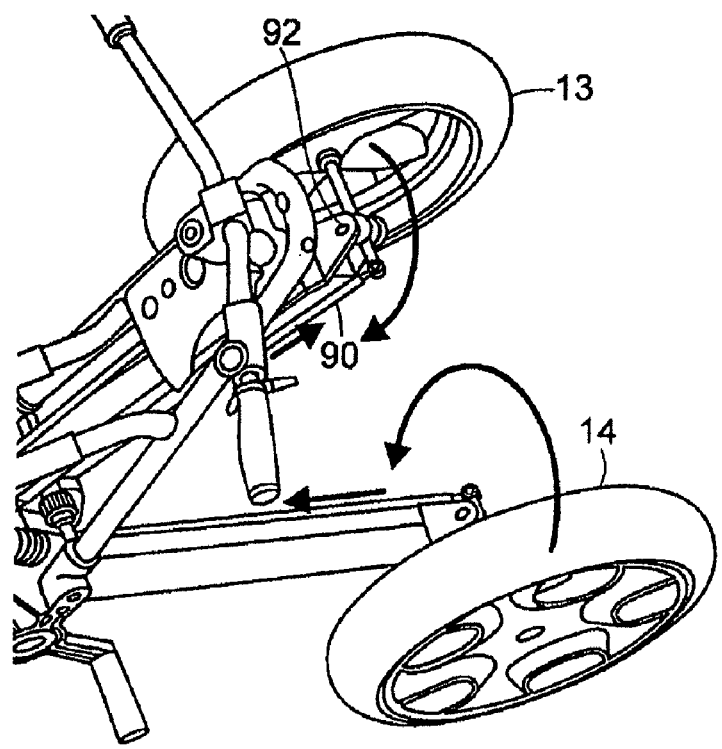
FIG. 11 shows the coupling of the lower pushrods to steer the forward wheels, in accordance with the embodiment of FIG. 10.

In operation of a vehicle that may operate on either two or four wheels, it may be beneficial that if a turn is initiated in one mode, it be smoothly continued, either as wheels leave the ground or as wheels remake ground contact. To that end, in accordance with preferred embodiments of the invention, a mechanical linkage is provided between the user yaw input and the forward wheels, while the rear wheels are controlled, in synchrony with any turn initiated by the user input, by means of differential rotation of the wheels. Referring to FIG. 10, vehicle steering is implemented, in accordance with the embodiment shown, by turning handlebar 18 about pivot 17. This serves two functions: steering the forward wheels, and providing electrical input to cause differential rotation of the aft wheels. To steer the forward wheels, motion is transferred, via bellcrank 80, to fore-aft axial motion of upper push rods 82, as indicated by arrows 83 in FIG. 7. Bellcrank 80 is a lever with two arms forming a fixed angle between them, and a fulcrum at the apex of the angle. This allows rotational motion (of the handlebar pivot) substantially transverse to the ground to be transferred to motion (of the upper push rods) having a significant component parallel to the ground. Upper push rods 82, in turn, via middle bellcranks 84, transfer motion to lower pushrods 90, shown in FIG. 11, which turn forward wheels 13 and 14 by causing them to pivot about vertical pivot axes 92. It is to be understood that any other couplings, mechanical or motorized, between the user input and the angle of forward wheels 13 and 14, may also be employed within the scope of the present invention.

At the same time that the user yaw input, such as the handlebar, governs the steering of the forward wheels as described above, a signal is generated, by means of a rotational transducer, or otherwise, to serve as the input to yaw controller 502 (shown in FIG. 3) to govern differential actuation of the rear wheels. Thus, the user-intended steering is accomplished, in accordance with this invention, whether or not the forward wheels are in contact with the ground. Various means of converting the mechanical user input (such as handlebar rotation angle) to a yaw signal input to the controller 70 are known in the art, such as those described in U.S. Pat. No. 6,581,714, for example, and any such means are encompassed within the scope of the present invention.

The described embodiments of the invention are intended to be merely exemplary and numerous variations and modifications will be apparent to those skilled in the art. All such variations and modifications are intended to be within the scope of the present invention as defined in the appended claims.

The invention claimed is:

1. A vehicle comprising:
   a plurality of wheels, including at least one forward wheel and at least two aft wheels;
   at least one motor actuator that drives the aft wheels;
   a user input device;
   a controller that controls the at least one motor actuator such that a direction imparted on the at least one forward wheel by the user input device is replicated by differential rotation of the aft wheels; and
   a rotational transducer that generates a signal to input to a yaw controller in response to rotation of the user input device.

2. A vehicle according to claim 1, wherein the controller may disregard information received from the user input device.

3. A vehicle according to claim 1, wherein the direction imparted on the at least one forward wheel by the user input device is in response to rotation of the user input device.

4. A vehicle according to claim 3, wherein the user input device is a handlebar.

5. A vehicle according to claim 1, wherein the user input device is coupled to the at least one forward wheel by a mechanical linkage.

6. A method for controlling a vehicle comprising:
controlling a direction of at least one forward wheel of the vehicle with a user input device;
generating a signal with a rotational transducer in response to rotation of the user input device to input to a controller for driving the aft wheels of the vehicle; and
driving at least two aft wheels of the vehicle with at least one motor actuator by differential rotation of the aft wheels to replicate the direction imparted on the at least one forward wheel.

7. The method of claim 6, comprising rotating the user input device to control the direction of the at least one forward wheel of the vehicle.

8. The method of claim 6, comprising coupling the at least one user input device to the at least one forward wheel of the vehicle by a mechanical linkage.

9. The method of claim 6, comprising generating a signal in response to the user input device that is input to a controller for controlling the direction of the at least one forward wheel.

10. A vehicle comprising:
a plurality of wheels, including at least one forward wheel and at least two aft wheels;
at least one motor actuator that drives the aft wheels;
a user input device coupled to the at least one forward wheel by a mechanical linkage; and
a controller that controls the at least one motor actuator such that a direction imparted on the at least one forward wheel by the user input device is replicated by differential rotation of the aft wheels.

11. A vehicle according to claim 10, wherein the controller may disregard information received from the user input device.

12. A vehicle according to claim 10, wherein the direction imparted on the at least one forward wheel by the user input device is in response to rotation of the user input device.

13. A vehicle according to claim 12, wherein the user input device is a handlebar.

14. A method for controlling a vehicle comprising:
controlling a direction of at least one forward wheel of the vehicle with a user input device;
coupling the user input device to the at least one forward wheel of the vehicle by a mechanical linkage; and
driving at least two aft wheels of the vehicle with at least one motor actuator by differential rotation of the aft wheels to replicate the direction imparted on the at least one forward wheel.

15. The method of claim 14, comprising rotating the user input device to control the direction of the at least one forward wheel of the vehicle.

16. The method of claim 14, comprising generating a signal in response to the user input device that is input to a controller for controlling the direction of the at least one forward wheel.

* * * * *